Figure 1:
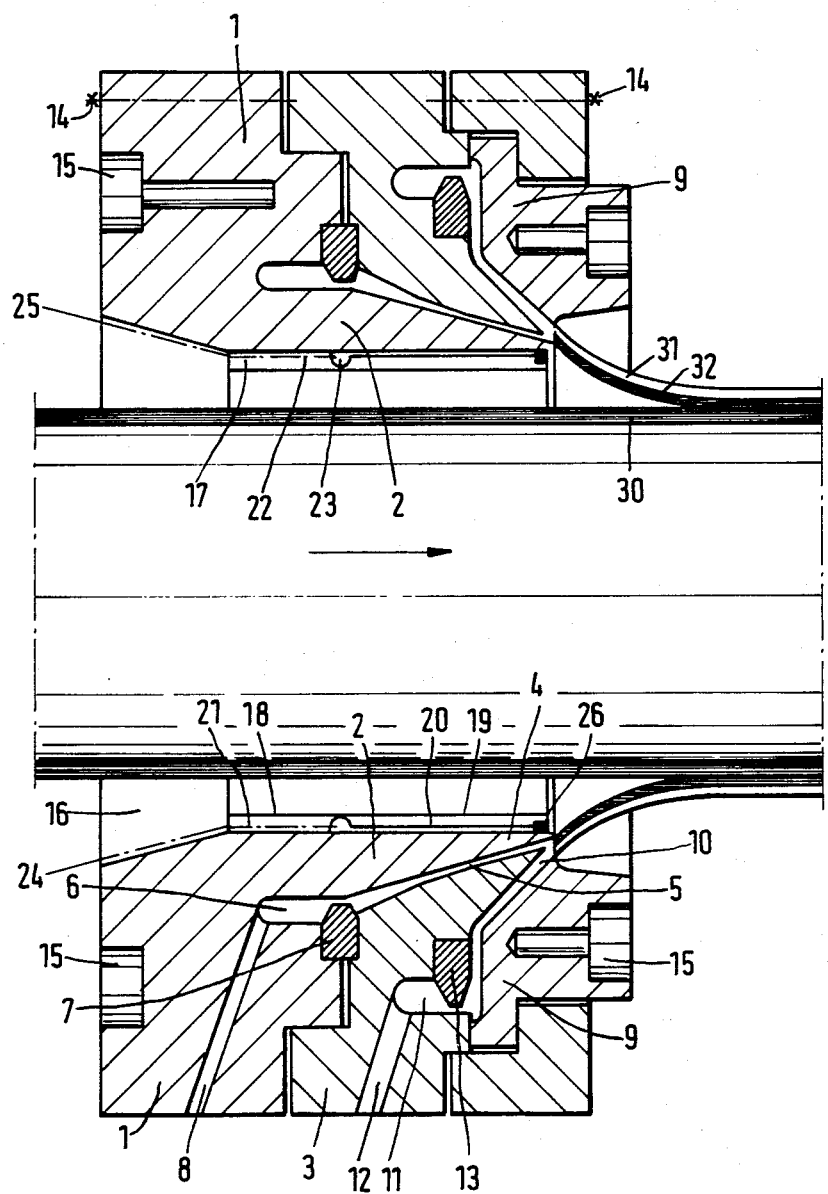

United States Patent [19]

Landgraf et al.

[11] Patent Number: 4,519,863
[45] Date of Patent: May 28, 1985

[54] METHOD AND DEVICE FOR JACKETING A STEEL PIPE WITH SEVERAL PLASTIC MATERIALS

[75] Inventors: Helmut Landgraf, Duisburg; Walter Stucke, Ratingen, both of Fed. Rep. of Germany

[73] Assignee: Mannesmann Aktiengesellschaft, Duesseldorf, Fed. Rep. of Germany

[21] Appl. No.: 381,769

[22] Filed: May 25, 1982

[30] Foreign Application Priority Data

May 27, 1981 [DE] Fed. Rep. of Germany ....... 3121773

[51] Int. Cl.$^3$ .............................................. B29D 23/04
[52] U.S. Cl. ........................... 156/244.12; 156/244.13; 156/244.23; 156/500; 264/173; 264/271.1; 264/279; 264/279.1; 425/113; 425/133.1
[58] Field of Search ....................... 156/244.12, 244.13, 156/244.14, 244.23, 500; 264/173, 174, 271.1, 272.11, 279, 279.1; 425/113, 133.1

[56] References Cited

U.S. PATENT DOCUMENTS

| 3,075,868 | 1/1963 | Long | 156/244.23 |
| 3,227,786 | 1/1966 | Cohen | 264/174 |
| 3,339,234 | 9/1967 | Utz | 156/244.12 |
| 3,972,970 | 8/1976 | Taylor | 264/45.9 |

Primary Examiner—Caleb Weston
Attorney, Agent, or Firm—Ralf H. Siegemund

[57] ABSTRACT

A method for making a polyethylene jacket on steel pipes including applying an inner foil upon the preheated steel pipe for purposes of providing adhesion thereto and of an outer, jacketing foil, also to be applied through a duel extrusion head which is to be heated to an operating temperature of approximately 170° C. During extrusion, a gaseous mixture is fed to the space between the surface of the tube to be jacketed and the inner foil, which gaseous mixture consists of air to which a reactive gaseous component, such as ozone, has been added; the inner foils is made from a material so that the gaseous mixture reacts under the formation of groups which provide adhesion, such as carboxylic groups.

9 Claims, 3 Drawing Figures

METHOD AND DEVICE FOR JACKETING A STEEL PIPE WITH SEVERAL PLASTIC MATERIALS

The invention relates to a device for jacketing steel pipes with a thermoplastic synthetic, particularly polyethylene, wherein a foil causing adhesion to the surface of the tube as well as a jacketing foil are deposited upon the preheated steel pipe, whereby the two foils are simultaneously extruded immediately prior to their depositing, in a hose-like configuration or as flat ribbons for purposes of winding, and whereby the extrusion head used for the extrusion is heated to an operating temperature of approximately 170° centrigrade.

In accordance with the Austrian Pat. No. 243,039, it is known to jacket steelpipes in polyethylene in such a manner that upon the cleaned and heated tube surface (100° centigrade) at first a melt adhesive is deposited, comprised primarily of polyisobutylene, and having been heated to approximately 150° centigrade, upon which a rigid polyethylene layer is deposited, serving as a corrosion protection and having been preheated to 200° centigrade, which layer is coated with the same melt adhesive as well as with a soft polyethylene layer serving as mechanical protection and having been heated to 120° centigrade. Additionally, one has to count to the state of the art a method of jacketing steel pipes in such a manner that an extruder head, having two broad slit nozzles is used for simultaneously extruding a flat polyethylene strip and a thermoplastic adhesion strip, which strips are together wrapped around the heated steel pipe in a helical fashion (German Pat. No. 17 71 764).

Furthermore, it is known to apply the synthetic constituting the jacketing in the form of seamless hoses upon the steel pipe and by means of coaxial extrusion under utilization of an annular channel extrusion head, whereby an ethylene copolymerizate is used as an adhesive for bonding with the surface of the tube (for example, German Pat. No. 25 19 046). An extrusion head suited for this method is, for example, described in German Pat. No. 19 57 078. A flier of the company BASF "Luplen A 2910 MX," dated April 1974, describes an ethylene copolymerizate serving as an adhesive for the coating. The known methods have in common that the steel pipe to be jacketed has to be preheated prior to the application of the thermoplastic synthetic to a temperature of between approximately 120° C. and 220° C. In the BASF flier, the temperature is limited to not more than 220° C. in order to avoid a decompositioning of the ethylene copolymerizate.

It is an object of the invention to suggest a method and a device suitable for this means, by means of which the effectiveness of the known adhesion medium and, therefore, the peeling strength of the jacketing can be improved or, in special cases, one may even dispense with the utilization of a special adhesive material.

In accordance with the preferred embodiment of the invention, a method for making a thermoplastic jacket on steel pipes particularly of a polyethylene jacket is to be improved, which method includes applying an inner foil upon the preheated steel pipe for purposes of providing adhesion thereto and of an outer, jacketing foil, also to be applied, whereby particularly the two foils are extruded immediately before their respective applications either in a hose-like configuration or as a flat strip serving for wrapping around the tube; moreover, the method to be improved includes an extrusion head which is to be heated to an operating temperature of approximately 170° C. The improvement to be provided in accordance with the invention is to include the following steps. During extrusion, a gaseous mixture is fed to the space between the surface of the tube to be jacketed and the inner foil, which gaseous mixture consists of air to which a reactive gaseous component, such as ozon, has been added, and selecting the inner foil from a material so that the gaseous mixture reacts under the formation of groups which provide adhesion, such as carboxylic groups. This method is particularly practiced by means and under utilization of an extrusion head which is provided with two annular nozzles, of which the first one is provided for the extrusion of the inner foil and the second one is provided for the extrusion of the outer jacket foil, whereby each one of these annular nozzles ends in an annular nozzle opening, circumscribing concentrically the tube to be jacketed. Furthermore, the two nozzles are to be provided in a common plane. The extrusion head is provided with a passage channel for the tube, and a steel cylinder is arranged in that channel concentrically circumscribing the steel pipe to be jacketed. A channel is provided in the wall of this steel cylinder for feeding the reactive gas, the channel being preferably of a helical configuration, ending in a gas exit opening right at the exit side of the tube from the channel. The gas exit opening is directed toward the gas between the tube surface and the inner foil or just directly toward the surface of the tube. The steel cylinder may additionally be provided with longitudinal bores for supplying and discharging a coolant, which bores end in an annular channel with their respective one end, and the oppsite ends are respectively connected to a feed path for a coolant and to a discharge path for such a coolant. The outer surface of the steel cylinder 17 bears to some extent on the inner surface of the extrusion head, particularly near the entrance side of the tube's passage channel. Moreover, the outer surface of the steel cylinder establishes an annular gap together with the inner surface of the extrusion head near the exit side for the tube, and the annular channel for the coolant ends in that gap for providing the coolant thereto. Alternatively, the steel cylinder bears over its entire length against the inner surface of the extrusion head, and a channel for the coolant is provides as a helical duct in the cylinder wall.

The effect of the reactive air-ozone mixture upon the inner synthetic foil serving as an adhesion, which foil can be extruded as a hose or as a ribbon to be wrapped, results in the formation of carboxylic groups in the polyethylene or such groups are increasingly activated upon utilization of an adhesion foil being comprised of an ethylene copolymerizate so that the adhesion of the jacket to the surface of the tube is considerably improved. Furthermore, this method permits a lowering of the tube's temperature to, thereby, reduce the extent of heating the extrusion head; and for a given cooling path for the jacketed tube, one can gain a larger throughput. For less extreme demands upon the adhesion of the jacket, one may dispense with the utilization of an expensive adhesive made of a copolymerizate and, instead, one can use cheaper polyethylene types having a higher melting index.

Figure 2:
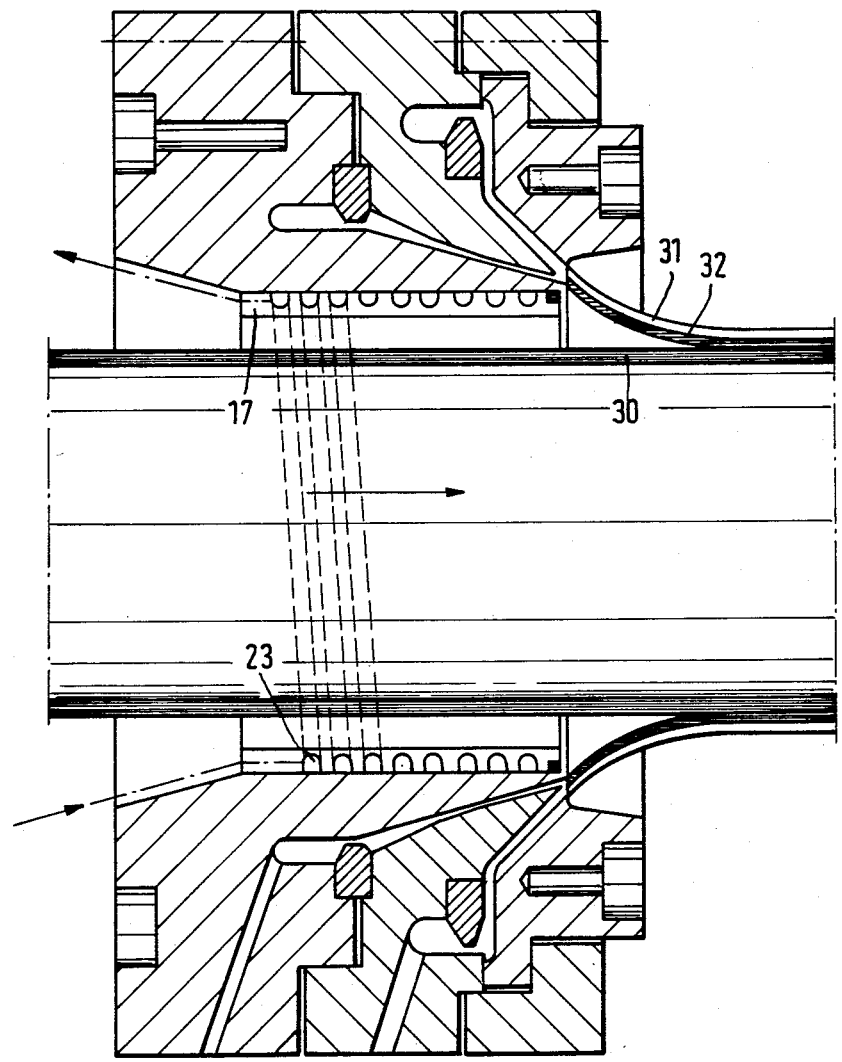

Examples for devices of the invention for jacketing with hose-shaped foils are depicted in the drawing. There is shown in:

FIG. 1 a longitudinal section through the extruder with a cooling device;

FIG. 2 another configuration of the cooling device; and

Figure 3:
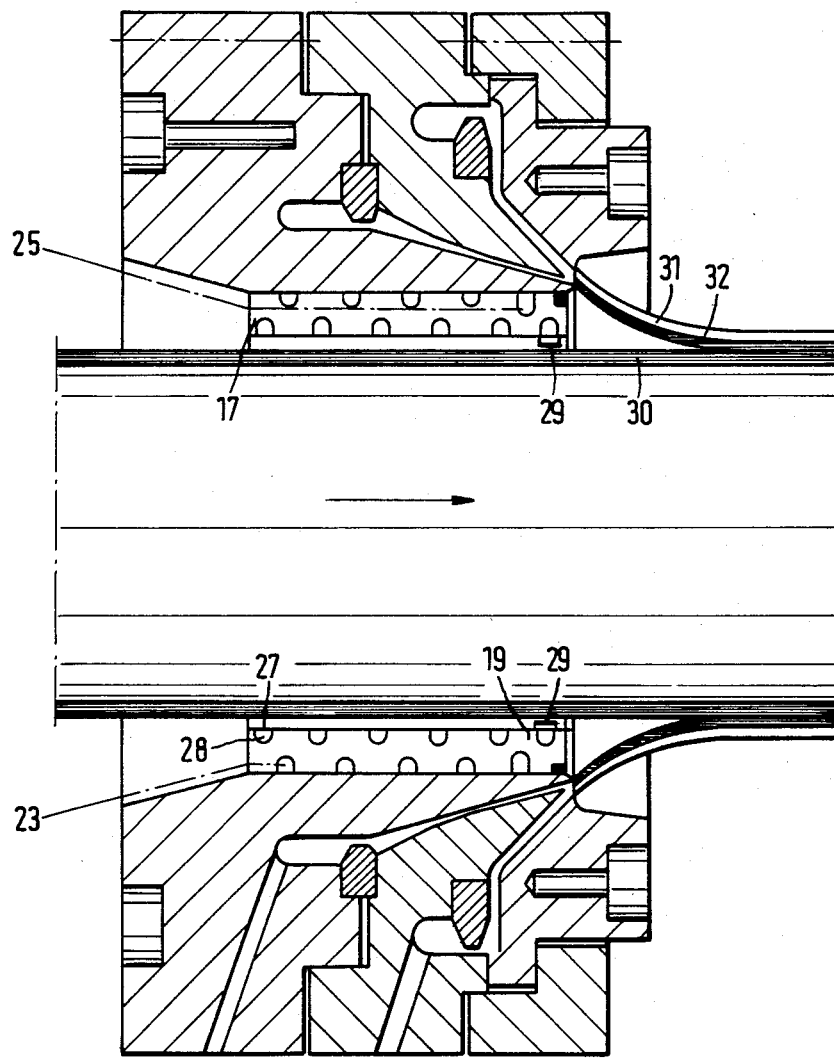

FIG. 3 a combined cooling and gas-feeding device.

The extruder head for extruding two hose-like foils is known in accordance with the German Pat. No. 19 57 078 and is comprised of three housing rings. Herein, a first housing ring 1 with mandrel 2 is configured as a single-part construction element. An intermediate ring 3 is positioned axially to housing ring 1 and downstream, as far as the direction of working is concerned; this ring 3 establishes annular gap 5 together with the conically tapering end portion 4 of the mandrel 2 for extruding the inner polyethylene hose. Furthermore, a baffle ring 7 is positioned exchangeably and stationary between the intermediate ring 3 and the annular channel 6. While the housing ring 1 serves for applying the inner polyethylene hose as emerging from the annular gap 5 upon tube 30 for the jacketing and is connected for this purpose to the feed 8, a second housing ring 9 is provided for applying the outer polyethylene hose, which ring 9 is configured similarly to the housing ring 1, and is closely connected with that side of the intermediate ring 3 which faces away from housing ring 1. The annular gap 5 ends directly ahead of the annular opening of a second annular gap 10, which gap 10 is established by the beveled outer surface of the intermediate ring 3 and by the inner surface of the housing ring 9 which extends parallel to that beveled outer surface of ring 3. The annular gap 10 communicates with an annular duct 11, which is connected to the polyethylene feed 12, and the cross section of the annular channel 11 can be varied just as in the case of the housing ring 1 by means of baffle ring 13. The housing ring 1, the intermediate ring 3, and the housing ring 9 are interconnected by means of screws 14. Controllable heating elements 15 heat the extrusion head up to the operating temperature.

A steel cylinder 17 is slid into the passage channel 16 of the first housing ring 1, which provides a gaseous or liquidous coolant for purposes of maintaining the operating temperature constant and for avoiding any additional heating of the extrusion head by the steel pipe, passing through channel 16 and having been preheated to 300° C. The outer surface of cylinder 17, in accordance with FIG. 1, abuts closely to the inner surface of mandrel 2 in the zone of tube entrance 18. Cylinder 17 together with the inner surface of the mandrel establishes an annular gap 20 in the range of the pipe exit side 19. The steel cylinder 17 is, furthermore, provided with two longitudinal bores 21 and 22 in that part of the cylinder 17 facing the entrance of the pipe. These longitudinal bores 21 and 22 end, on one hand, in a radial channel 23 of annular configuration which communicates with the annular gap 20 while, on the other hand, bore 21 is connected to a coolant duct 24 and bore 22 is connected to a coolant discharge duct 25. The annular gap 20 is closed at the front exit end of the extrusion head by means of a sealing ring 26.

By way of example, the gaseous coolant may be air and a liquidous coolant may be oil. These media cause the temperature of the extrusion head to maintain the desired operating temperature of 170° C. Also, a preferred example is to be seen in the utilization of a polyethylene for the extrusion head, having a melt index of i2.16=0.4 to 0.6 g/10 min. while the inner foil is made of polyethylene with a melt index which approximately 10 times higher, i.e., i2.16=5 to 8 g/10 min. Moreover, the tube can now be preheated to approximately 300° C.

In accordance with FIG. 2, the cooling duct 23 is configured helically. This provides the advantage that a sufficiently large cooling area is established as a mechanically stable construction.

The helically configured, annular channel 27 in the combination shown in FIG. 3 is feeding a reactive gas from a duct 28 which terminates in exit openings 29, from which the gas mixture reaches the intermediate chamber between the inner foil and the outer surface of the tube.

We claim:

1. A method of jacketing a preheated steel pipe, comprising the steps of heating the pipe to about 300° C.;

extruding a first foil of polyethylene and applying the same to the pipe;

extruding a second foil, of a thermoplastic ethylene polymer material and applying the same such that it lodges between the pipe and the first foil using an extrusion head for both of the concurring extrusion steps and maintaining the head at a temperature of about 170° C. and feeding a gas toward the pipe to be effective on the second material as it is being applied, the gas including air and a component reacting with the second foil material for rendering the second foil adhesive.

2. A method as in claim 1, wherein the foils are made of the same material.

3. A method as in claim 1, and including the step of cooling the extrusion head by oil or air in order to provide said maintaining step.

4. A method as in claim 1, the second foil being also made of polyethylene, but having a significantly higher melt index than the first foil.

5. A method as in claim 1 or 4, wherein the reactive component is ozone and adhesion results from the generation of carboxylic groups in the second foil.

6. An apparatus for jacketing steel pipes by means of extrusion, for extruding a first inner foil onto a pipe passing through the extrusion means and a second outer foil onto the inner foil as extruded, the improvement comprising:

a steel cylinder in the extrusion means and being passed through by the pipe, channel means in the steel cylinder for feeding a reactive gas toward a space between the inner foil as it is about to be applied to the pipe and a surface portion of the pipe just about to be covered by the inner foil; there being longitudinal bores in said cylinder, an annular channel in the cylinder, in which said bores end, and one of said bores provided for receiving a coolant, the other one of the bores provided for discharge of that coolant.

7. The apparatus as in claim 6, said cylinder having an outer surface, the outer surface having an upstream and a downstream portion with respect to a direction of passage of the pipe, said upstream portion tightly engaging an inner surface of said extrusion means, said downstream portion together with an inner surface of the extrusion means establishing an annular gap, and means for feeding a coolant to that gap and discharging that coolant from said gap.

8. An apparatus for jacketing steel pipes by means of extrusion, for extruding a first inner foil onto a pipe passing through the extrusion means and a second outer foil onto the inner foil as extruded, the improvement comprising;

a steel cylinder in the extrusion means and being passed through by the pipe, channel means in the steel cylinder for feeding a reactive gas toward a space between the inner foil as it is about to be applied to the pipe and a surface portion of the pipe just about to be covered by the inner foil; said steel cylinder having an outer surface engaging tightly an inner surface of said extrusion means over the entire length of the steel cylinder, there being a helical duct in said surface of the steel cylinder to receive and pass through a coolant.

9. Extrusion head for jacketing steel pipes in a twin-hose core, comprising;

a head body having two annular channels ending in extrusion nozzles, the nozzles being situated in a common plane;

a passage in the body for being passed through by a steel pipe to be jacketed, and being concentrically arranged to the nozzles; and a steel cylinder in the passage being provided with a helical duct for conducting a reactive gas, the duct ending in a opening directed toward a pipe passing through the cylinder.

* * * * *